Dec. 10, 1935.  G. M. LILLY  2,023,533
TRANSMISSION BRAKE
Filed March 28, 1935
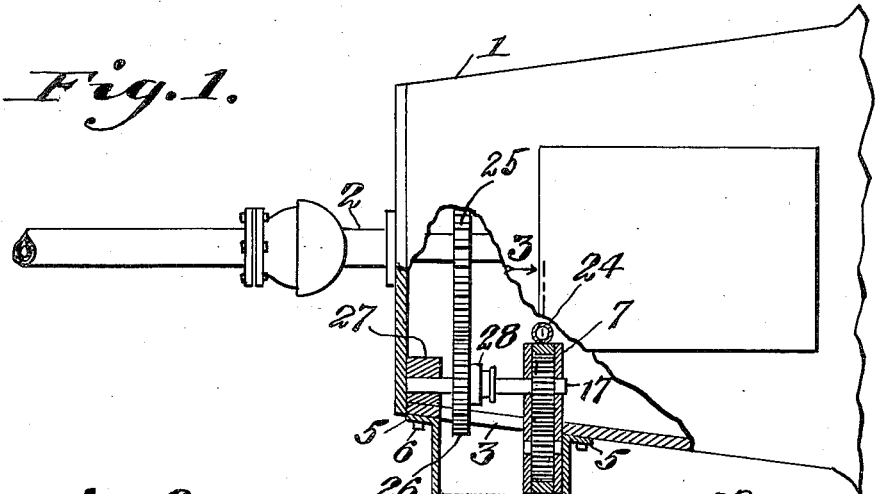
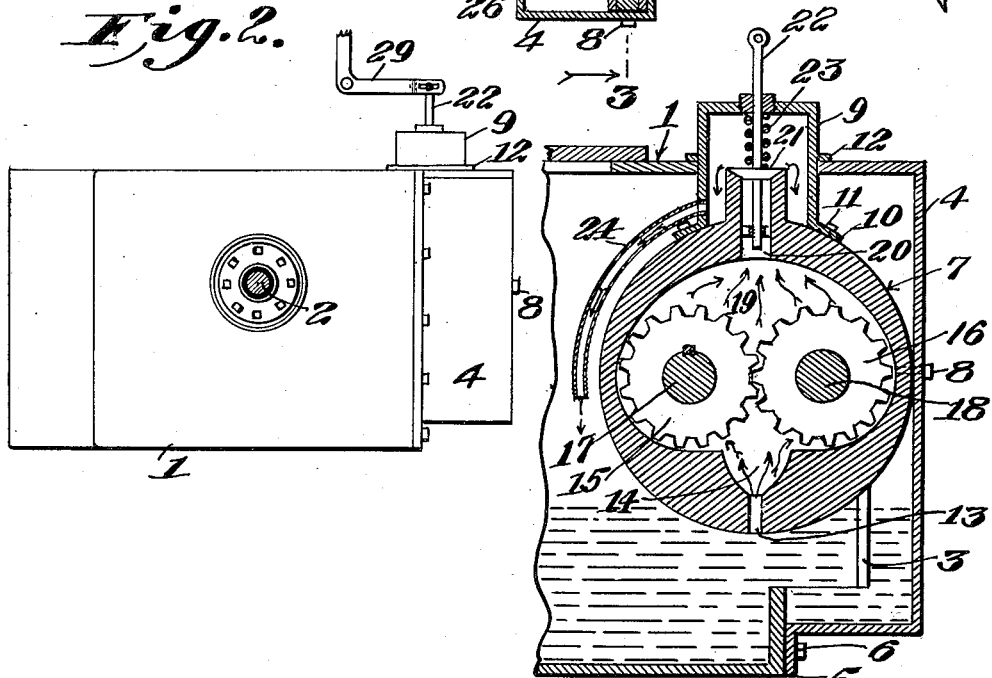
Inventor
Garnett M. Lilly.
By E. E. Vrooman & Co.,
His Attorneys.

Patented Dec. 10, 1935

2,023,533

UNITED STATES PATENT OFFICE 2,023,533

TRANSMISSION BRAKE

Garnett M. Lilly, Holston, Va.

Application March 28, 1935, Serial No. 13,517

3 Claims. (Cl. 188—92)

This invention relates to a transmission brake.

An object of my invention is the construction of an improved type of oil brake especially adapted for motor driven vehicles in connection with which it will be hereinafter briefly described, but my invention may be applied to any rotating shaft, which is at times desirable to stop or slow down.

Another object of my invention is the construction of a transmission case so as to receive a specific and novel type of oil brake, without materially increasing the cost of construction, nor in any degree lessening the efficiency of the mechanism.

A still further object of my invention is the construction of an oil or liquid brake built into the transmission case, whereby the transmission case may readily be of a standard structure, and the assemblage accomplished at a minimum expense.

With the foregoing and other objects in view, my invention comprises certain novel constructions, combinations and arrangements of parts as will be hereinafter fully described, illustrated in the accompanying drawing, and more particularly pointed out in the appended claims.

In the drawing:

Figure 1 is a top plan view of a mechanism constructed in accordance with the present invention, shown partly in section.

Figure 2 is a view in end elevation of the mechanism.

Figure 3 is an enlarged sectional view taken on line 3—3, Fig. 1 and looking in the direction of the arrows.

In the drawing, in which I have preferably shown the preferred embodiment of my invention, 1 designates a standard transmission case into which extends the usual drive shaft 2. The drive shaft 2 is driven by the usual drive motor when the invention is adapted to vehicle use. Preferably in a side of the transmission case 1, I form an opening 3 over which is placed the brake casing 4; this casing 4 is provided with flanged edges 5, abutting against a side face of case 1, and suitable fastening means 6 is employed for securely retaining brake casing 4 in position.

A gear casing 7 is in opening 3 (Fig. 1); part of casing 7 is in brake casing 4 and transmission case 1. A suitable fastening means 8 extends through the side of brake casing 4 and into gear casing 7, assisting in holding the same in an assembled position.

Mounted on gear casing 7, and extending above brake casing 4 is a valve casing 9. This valve casing 9 is provided with a flange 10 on its lower end, which conforms to the contour of gear casing 7 (Fig. 3). Suitable fastening means 11 extend through flange 10 into gear casing 7. After valve casing 9 is positioned, a ring-like member 12 may be suitably secured to valve casing 9 to assist in supporting same upon brake casing 4.

The gear casing 7 is provided with an inlet 13 which in the present instance, allows oil from the transmission case to enter the gear casing 7. Therefore, the transmission case in this embodiment constitutes a reservoir for supplying the brake mechanism with the necessary oil for operation. In the bottom of gear casing 7 there is formed a trough 14, communicating with inlet 13. In the lower portion of gear casing 7 is positioned a gear 15 and a gear 16. Gear 15 is mounted on auxiliary shaft 17 and gear 16 is mounted on stub shaft 18. Above gears 15 and 16 is formed a large compartment 19 for receiving the oil drawn into gear casing 7 sufficiently to increase the efficient operation of the mechanism. An outlet 20 is formed in the top of gear casing 7, which is normally closed, when the mechanism is not operating, by a movable valve 21. Valve 21 is fixedly secured to valve stem 22. Around valve stem 22 is a coil spring 23, which is of sufficient strength to seat the valve 21, but during the ordinary running of the motor, oil that is drawn into gear casing 7, will pass out of the gear casing, unseating valve 21, and will then be discharged through outlet pipe 24 back into the reservoir, constituted in this instance by the bottom portion of the transmission case 1.

A gear 25 is fixedly secured to and driven by drive shaft 2 within the transmission case 1 (Fig. 1). This gear 25 meshes with sliding gear 26. Gear 26 is suitably keyed in any ordinary manner (not shown) on the auxiliary shaft 17. This auxiliary shaft is journalled at one end in the gear casing 7 and its other end is journalled in a suitable bearing 27 fastened in the transmission case 1. Suitable means (not shown) can be attached to the collar portion 28 of gear 26 for shifting the gear on the auxiliary shaft into and out of meshing engagement with gear 25, as the operator desires.

Suitable manually operated means 29 (Fig. 2) is connected to the outer end of valve stem 22, so that when it is desired to slow down the motor vehicle upon which the mechanism is mounted, or entirely stop the motion of the vehicle, the operator can apply force to the means 29, causing the valve 21 to be held tightly seated, against oil pressure, thereby confining the oil in gear casing 7 under great pressure, which will control the rotation of gears 15 and 16, causing the braking action to take place on drive shaft 2, when gear 26 is in mesh with gear 25. Therefore, it will be understood that the operator can throw gear 26 out of mesh with gear 25, or into mesh as desired. Further, the operator can permit the free running of the drive shaft by sliding gear 26 out of mesh with gear 25.

My mechanism is admirable for use on motor vehicles that encounter steep grades, such as is common during mountain traveling. There will be no heating up of the brake mechanism, and very little wear, hence, my improved mechanism has longevity.

In the present embodiment, I have shown the mechanism built into the transmission case on one side, whereas it could be built into the opposite side of the case, or it may be attached in other convenient ways (not shown) without departing from the spirit and scope of the following claims.

It will be understood that as illustrated, my braking mechanism depends upon the oil in the transmission case, and hence it will be desirable to see that the oil is sufficiently satisfactory at all times to make for efficient operation of the mechanism.

In the embodiment illustrated in the accompanying drawing, the described specific parts are of importance in the present assemblage, and each part or element is needed for an efficient structure, as described, and hence are part of the novel combination in some of the appended claims.

While I have described the preferred embodiment of my invention and illustrated the same in the accompanying drawing, certain minor changes and alterations may appear to one skilled in the art to which this invention relates, during the extensive manufacture of the same, and I, therefore, reserve the right to make such changes or alterations as shall fairly fall within the scope of the appended claims.

What I claim is:

1. In a mechanism of the class described, the combination with a transmission case provided with a side opening and with a drive shaft extending into said case contiguous to said opening, an auxiliary shaft parallel with said drive shaft and at one corner of said transmission case, a gear fixedly secured to said drive shaft, a sliding gear in said opening and mounted on said auxiliary shaft and adapted to mesh with said fixed gear, and a brake mechanism in said side opening and including said auxiliary shaft, substantially as shown and described.

2. In a mechanism of the class described, the combination of an oil-containing transmission case provided with a drive shaft, a brake casing against said transmission case and opening into same and receiving oil from said transmission case, a gear casing provided with an inlet within said brake casing, said gear casing extending into said transmission case, whereby oil will enter through said inlet into said gear casing from said transmission case and said brake casing, a valve casing extending through part of said transmission case and connected at its inner end to said gear casing, and manually controlled means in all of said casings, whereby when oil is retained under pressure in said gear casing slowing up or entirely stopping rotary movement of the drive shaft will result.

3. In a mechanism of the class described, the combination of a transmission case provided with a side opening, a brake casing fastening against said transmission case over its side opening, a gear casing within said side opening and projecting into said brake casing and said transmission case, fastening means extending through said brake casing and into the side of said gear casing, a valve casing extending down through the top of said brake casing and provided on its lower end with a flange, said flange conforming to the contour of said gear casing, fastening means extending through said flange into said gear casing, said gear casing provided with upwardly extending outlet in said valve casing, a valve stem extending downwardly through the top of said valve casing and into said upwardly extending outlet, a valve secured to said valve stem and normally resting on said outlet, an outlet pipe opening at its upper end into said valve casing and discharging into said transmission case at its lower end, said gear casing provided with an inlet and with a trough in its lower portion, a stub shaft and an auxiliary shaft in said gear casing near said trough, meshing gears in said gear casing on said shafts, said gear casing provided with a large compartment above said gears, said auxiliary shaft extending beyond one side of said gear casing with one end projecting to one end of said transmission case, a bearing in said transmission case supporting the projecting end of said auxiliary shaft, a sliding gear on said auxiliary shaft within said transmission case, a drive shaft in said transmission case, and a gear fixed to said drive shaft and adapted to mesh with said sliding gear, substantially as shown and described.

GARNETT M. LILLY.